(No Model.)
W. T. FOX.
WATER CLOSET.
No. 591,397.  Patented Oct. 12, 1897.
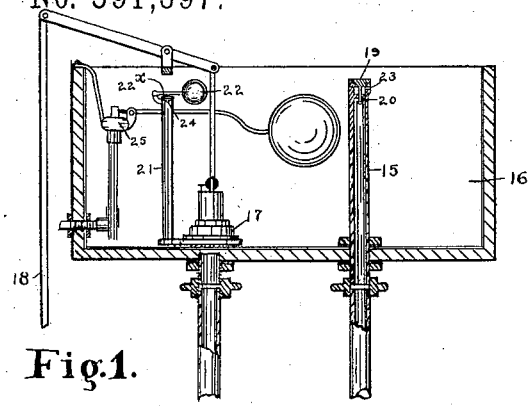
Fig.1.
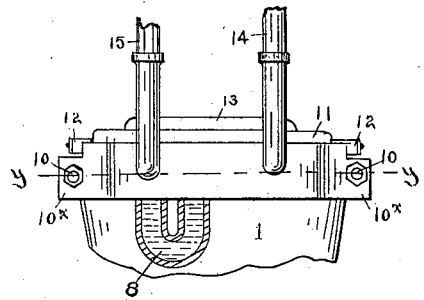
Fig.2.
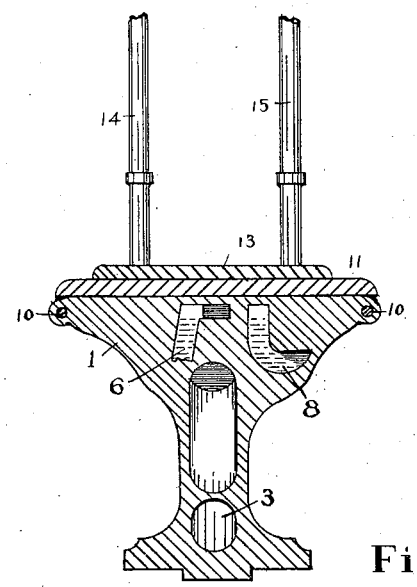
Fig.3.
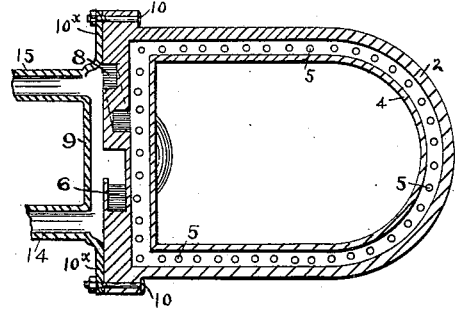
Fig.4.  Fig.5.
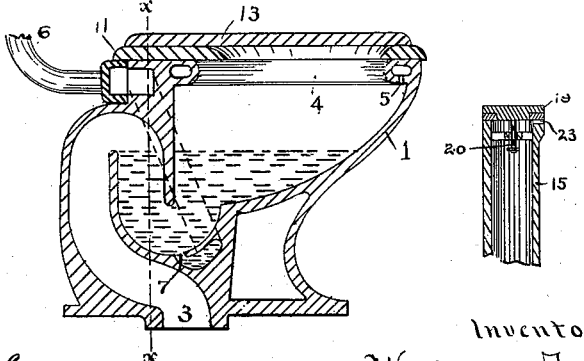
Witnesses,
Giles Willard Rich.
G. G. Roda.
Inventor
William T. Fox
J Church & Church
his atty's.

UNITED STATES PATENT OFFICE.

WILLIAM T. FOX, OF ROCHESTER, NEW YORK.

WATER-CLOSET.

SPECIFICATION forming part of Letters Patent No. 591,397, dated October 12, 1897.

Application filed January 7, 1896. Serial No. 574,574. (No model.)

*To all whom it may concern:*

Be it known that I, WILLIAM T. FOX, of Rochester, in the county of Monroe and State of New York, have invented certain new and useful Improvements in Water-Closets; and I do hereby declare the following to be a full, clear, and exact description of the same, reference being had to the accompanying drawings, forming a part of this specification, and to the reference-numerals marked thereon.

My present invention relates to water-closets, and has for its objects to provide improved means for flushing the closet and washing the bowl thoroughly and filling the trap properly, and the closet will be noiseless in operation; and it consists in certain improvements by which these objects are carried out and in improvements in construction and combinations of parts, all as will be hereinafter described, and the novel features pointed out in the claims at the end of this specification.

In the drawings, Figure 1 is a sectional view of a tank and a closet-bowl constructed in accordance with my invention, the section through the bowl or "crockery" being taken on the line $xx$ of Fig. 4. Fig. 2 is a rear view of the upper portion of the bowl; Fig. 3, a horizontal sectional view of the bowl, taken on the line $yy$ of Fig. 2; Fig. 4, a vertical sectional view of the bowl; Fig. 5, an enlarged sectional view of the top of the flushing-pipe.

Similar reference-numerals in the several figures indicate similar parts.

The base or bowl 1 of my improved closet is somewhat similar to the one shown in my prior patent, No. 518,753, dated April 24, 1894, consisting, preferably, of a single piece of earthenware, porcelain, or other material, having the basin or bowl proper, 2, the trapped discharge-passage 3, leading to the sewer, and the flushing rim or chamber 4 at the top, having apertures 5 for flushing and washing the basin. Formed also in the bowl is a water-passage 6, open at the rear and having a jet-orifice 7 in the lower end of the trap for discharging the contents of the basin, and a small trapped passage 8, leading to the flushing-chamber and also open at the rear side of the base or bowl.

9 indicates a plate or cover arranged to form a small chamber over the entrances of the passages 6 and 8 and secured to the rear of the bowl by headed bolts 10, having nuts thereon, and passing horizontally through lugs or ears $10^\times$, formed on the sides thereof, said ears being of considerable length in the direction of the bolts and affording a firm bearing therefor and not liable to be broken off, while ordinary bolts may be employed for securing the parts without requiring special fittings.

11 indicates the seat, pivoted at 12 to the plate 9, and 13 the cover, pivoted to the seat, as shown in my prior patent.

14 and 15 indicate two passages in the form of pipes connected, in the present embodiment of my invention, to the plate 9, the former extending to the supply-tank 16, where its upper end is provided with a tank-valve 17, (such as contained in my pending application, Serial No. 488,378, for instance,) adapted to be opened by a pull-lever 18, as usual, and to close by its weight or otherwise, and having connected to the valve-casing the overflow-pipe 21, provided at its upper end with an overflow-float 22 and a cap $22^\times$, normally closing the end of the pipe, excepting for a small aperture 24, allowing the entrance of a small amount of air to the pipe. The construction of the valve 17 is such that when the valve is opened the water in the tank will pass down the pipe 14 to the bowl. The pipe or passage 15 extends, preferably, through the bottom of the tank, and upon its upper end and above the normal level of the water is as mall valve 19, resting loosely upon the pipe 15, having packing on its under side.

The valve 19 is provided with a short stem 20, passing loosely through a spider, and the end of the pipe 15 is provided with a small aperture 23, which is not closed when the valve is in normal position, but permits the ingress of air to the pipe when the water falls therein, as will be explained.

25 indicates the usual supply float-valve for regulating the supply of water to the tank.

It will be understood that normally the passages 14 and 15 are emptied of water, the trap in the passage 6 is full, and water is contained in the bowl, as shown, trapping the passage 3. When it is desired to discharge the bowl of its contents, the operator raises the valve 17, as usual, allowing the water in the tank to descend through the passage 14; but instead of causing the air in said passage to be forced out through the flushing-rim, as usual in closets having an open pipe normally filled with air, this air is forced up through the passage 15 and out at the upper end thereof, lifting the loose valve 19, (the trap in the passage 8 preventing the air from reaching the rim and being forced through the closet,) while a portion of the water following will pass through the jet-passage 6, discharging the contents of the bowl, as usual, and the balance, in excess of what passes through the flushing-passage 8, will pass up the passage 15, driving the air before it, lifting valve 19 until the same water-level is attained in passages 14 and 15, and then (the valve 15 being closed) the water in both said passages will gradually fall by reason of the small openings 23 and 24 at the upper ends of the pipes 15 and 14 (the valve 19 being closed) and continue to pass to the closet, thereby gradually refilling the bowl to the proper level until both said passages are emptied, the trap in passage 8 being left full of water. This arrangement of passages, irrespective of the details of construction, is very advantageous, as I am enabled to provide a dry supply-pipe for the closet (as distinguished from one normally full to the valve) without the necessity, heretofore existing, of forcing the air in said passage through the flushing-rim, as it is the passage of this air through the closet that makes this class of devices noisy and therefore objectionable.

By connecting the two pipes or passages to the plate 9 and connecting the flushing and trapped washing passages directly with the chamber covered by it I need only a very simple fastening device—i.e., the bolts 10—which is readily secured by an unskilled operator. It will be understood that a suitable packing is arranged between the plate 9 and the rear of the crockery to make a tight joint. While I prefer to extend the passage 15 through the tank, as shown, this is not necessary.

I claim as my invention—

1. In a water-closet, the combination with the bowl, the flushing jet-passage and a trapped washing-passage, of an elevated tank, a water-pipe leading therefrom having a small opening at its upper end and connected with the flushing jet-passage and the washing-passage, a valve for admitting water from the tank to said pipe, and the pipe of sufficient size to serve as a water-reservoir open at its upper end and connecting with the water-pipe at or near the bowl, substantially as described.

2. In a water-closet, the combination with the bowl, the flushing jet-passage, a trapped washing-passage, and a single plate on the bowl at the entrance of both passages and forming a chamber, of an elevated tank, a pipe leading therefrom connected to the chamber and having a restricted opening at its upper end, a valve for admitting water to the pipe from the tank and a pipe of sufficient size to serve as a water-reservoir connected to the plate and opening into the chamber and also open at its upper end, substantially as described.

3. In a water-closet, the combination with a bowl, a flushing jet-passage and a trapped water-passage, of an elevated water-tank, a pipe leading therefrom and communicating with the jet and flushing passage, a valve for admitting water from the tank to said pipe, and a second pipe of sufficient size to serve as a water-reservoir connecting with the water-pipe below the tank extending above the bottom of the latter and having its upper end open to the air, substantially as described.

4. In a water-closet, the combination with a bowl having a flushing jet-passage and a trapped water-passage, of an elevated tank, a pipe leading therefrom to the bowl, a valve for admitting water from the tank to said pipe, a second pipe connecting with the water-pipe below the tank and extending above the bottom of the latter, the check-valve at the upper end of said second pipe, substantially as described.

5. In a water-closet, the combination with a bowl having a flushing jet-passage and a trapped water-passage, of an elevated tank, a pipe leading therefrom to the bowl, a valve for admitting water from the tank to the pipe, a pipe communicating with the water-pipe near its upper end, and a check-valve for closing it, said pipe having a small aperture for permitting the entrance of air when the check-valve is closed, whereby the water in the pipe may force the air out through the check-valve, and the fall of the column of water in said pipe will be gradual, substantially as described.

6. In a water-closet, the combination with a bowl having a flushing jet-passage, and a trapped washing-passage, of an elevated tank, a water-pipe leading therefrom to the bowl, an overflow-pipe, and a float-valve normally closing it, a valve for admitting water to said pipe from the tank, a pipe connecting with the water-pipe at or near the bowl extending to near the top of the tank and having a small aperture open to the air, and a check-valve closing the end of the pipe, substantially as described.

WILLIAM T. FOX.

Witnesses:
F. F. CHURCH,
G. A. RODA.